United States Patent [19]

Grotness et al.

[11] 4,134,306

[45] Jan. 16, 1979

[54] ROTARY ACTUATOR

[75] Inventors: Gunnar Grotness, Fort Wayne, Ind.; Charles S. Smith; Robert H. Morris, both of Rochester, N.Y.; Peter W. Boyer, Fort Wayne, Ind.

[73] Assignees: Phd, Inc., Fort Wayne, Ind.; Hughes Industrial Products, Inc., Rochester, N.Y. ; part interest to each

[21] Appl. No.: 724,962

[22] Filed: Sep. 20, 1976

[51] Int. Cl.[2] .......... F16H 19/04

[52] U.S. Cl. .......... 74/29; 92/40

[58] Field of Search .......... 74/29, 89.15; 92/40, 92/42, 43

[56] References Cited

U.S. PATENT DOCUMENTS

| | | | |
|---|---|---|---|
| 507,142 | 10/1893 | Lloyd | 74/29 |
| 2,373,526 | 4/1945 | Zellos | 92/42 |
| 2,376,711 | 5/1945 | Mock | 92/40 |
| 2,377,461 | 6/1945 | Swift | 92/40 |
| 2,856,131 | 10/1958 | Conlan | 92/40 |
| 3,797,324 | 3/1974 | Sheesley et al. | 74/89.15 |

*Primary Examiner*—Benjamin W. Wyche

*Assistant Examiner*—Wesley S. Ratliff, Jr.

*Attorney, Agent, or Firm*—Gust, Irish, Jeffers & Rickert

[57] ABSTRACT

A rotary actuator for converting reciprocating motion to rotary motion including a housing having spaced-apart end plates connected by guide rods. A bellows is provided having opposite sides one of which is connected to one of the end plates, the bellows being adapted to be connected to a source of fluid under pressure so that the bellows expands from a collapsed to an expanded position. A guide plate is provided movably mounted on the guide rods with the other bellows side being connected thereto. A rack and pinion assembly is provided mounted on the other end plate, the rack being connected to the guide plate so that expansion and contraction of the bellows causes linear movement of the rack thereby imparting rotary movement to the pinion. A spring acts between the guide plate and the other end plate thus resisting expansion of the bellows and returning it to the collapsed position upon the release of fluid pressure. Adjustable stops are provided for limiting rotational movement of the pinion between predetermined first and second angularly spaced positions.

14 Claims, 2 Drawing Figures

ROTARY ACTUATOR

BACKGROUND OF THE INVENTION

1. Field of the Invention

This invention relates generally to rotary actuator devices for converting reciprocable motion to rotary motion.

2. Description of the Prior Art

Rotary actuators are commonly provided for converting linear movement to rotary movement, and are commonly used for opening and closing butterfly valves used in chemical processes and in water treatment facilities. Such rotary actuators have commonly employed a rack and pinion assembly for converting linear to rotary movement, the rack being actuated by a solenoid or a fluid power cylinder. Solenoid operated rotary actuators require appreciable current, sometimes over sustained periods of time, while fluid power cylinder operated rotary actuators involve the usual seal problems and close tolerances in machining the cylinder. It is therefore desirable to provide a fluid power operated type of rotary actuator employing a bellows for providing the operating force rather than the usual cylinder and piston.

SUMMARY OF THE INVENTION

A rotary actuator including a bellows having an inlet for admitting fluid under pressure thereto thereby to cause expansion thereof from collapsed to expanded positions. Means are provided for mounting the bellows for expansion and contraction along a first axis, and resilient means are provided for resisting expansion of the bellows and for returning the same to its collapsed position upon release of the fluid pressure. Cooperating rack and pinion elements are provided and means are provided for mounting the rack element for linear movement along the first axis. Means are provided for mounting the pinion element for rotary movement on a second axis normal to the first axis, and means are provided for operatively connecting the rack element to the bellows so that the pinion element is rotated in opposite directions in response to expansion and contraction of the bellows. The pinion element has two angularly spaced abutments thereon and stop members are provided respectively engaging the abutments in first and second rotational positions of the pinion element thereby limiting its rotational movement.

It is accordingly an object of the invention to provide an improved fluid powered rotary actuator.

Another object of the invention is to provide an improved rotary actuator for converting linear to rotary movement incorporating a bellows as the force-exerting element.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
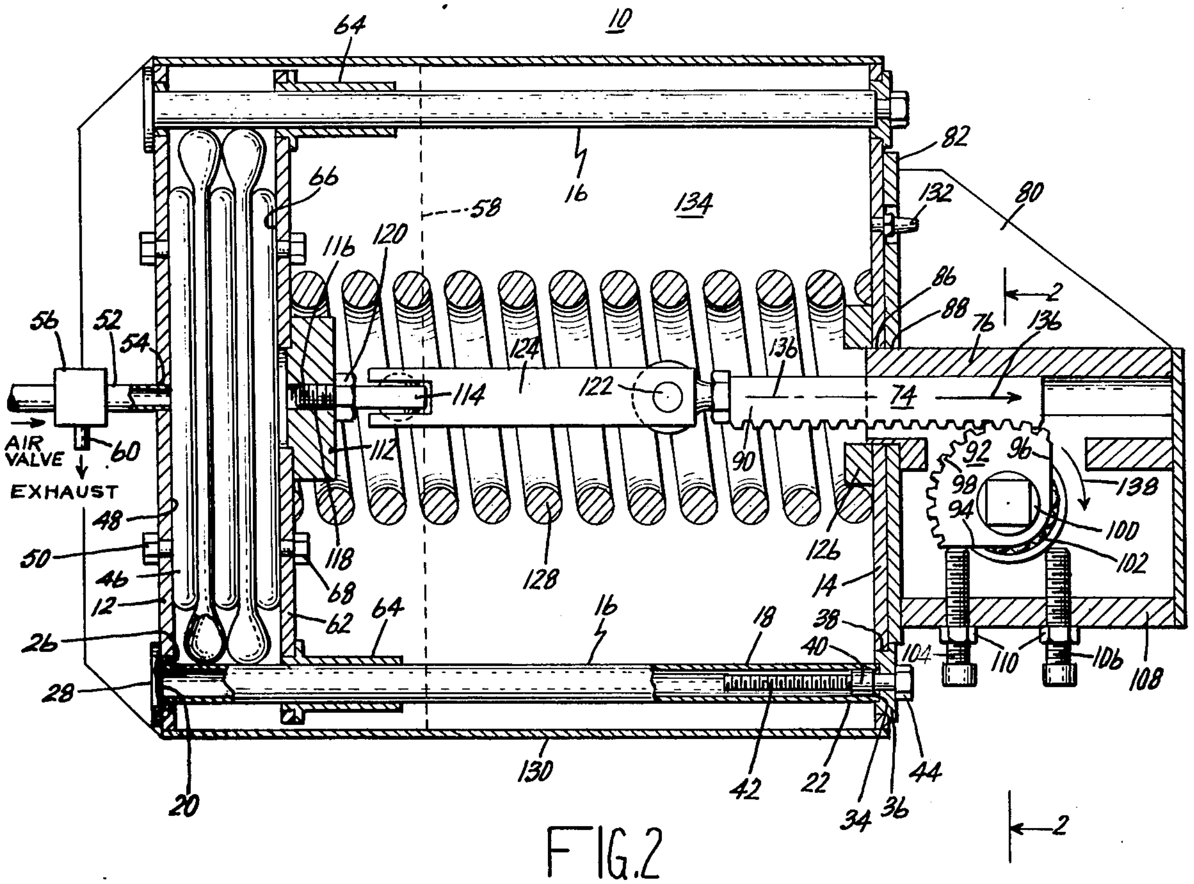
FIG. 1 is a side cross-sectional view showing the improved rotary actuator of the invention.
Figure 2:
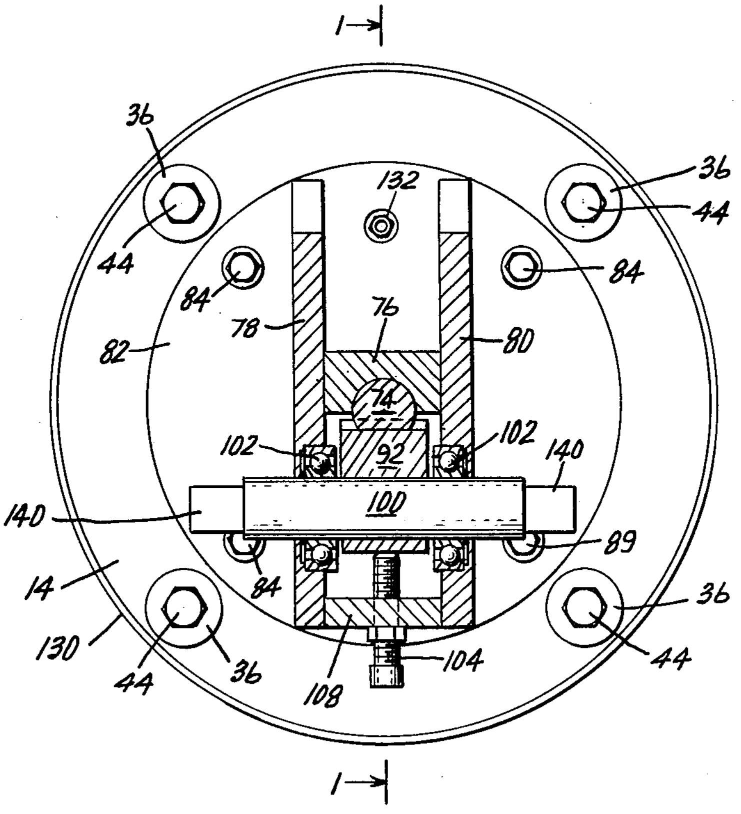
FIG. 2 is a cross-sectional view taken along the line 2—2 of FIG. 1.

Referring now to the drawing, the improved rotary actuator of the invention, generally indicated at 10, comprises first and second end plate members 12, 14 connected by four guide rod assemblies 16. Each of the guide rod assemblies 16 comprises a tubular member 18 having opposite ends 20, 22. End 20 of tubular member 18 is received in opening 26 in end plate member 12. Cap 28 is secured by welding to end 20 of tubular member 18. End 22 of tubular member 18 is seated in recess 34 in bushing 36 which is seated in opening 38 in end plate member 14. Threaded member 40 is seated in end 22 of tubular member 18 and secured thereto, as by welding. Threaded fastener 42 engages threaded member 40 and has head 44 engaging bushing 36.

Bellows unit 46 formed of suitable resilient material, such as rubber, is disposed within guide rod members 16 and has one side 48 secured to end plate member 12, as by threaded fasteners 50. Pneumatic line 52 extends through opening 54 in end plate member 12 and communicates with the interior of bellows 46. Valve 56 in pneumatic line 52 selectively admits air under pressure to the interior of bellows 46 thereby to cause the same to expand from its collapsed position, as shown in solid lines in FIG. 1 to an expanded position, as shown in dashed lines at 58. Valve 56 has exhaust port 60 for exhausting air from the interior of bellows 46 upon collapse thereof, as will hereinafter be described.

Guide plate member 62 is movable mounted on guide rod members 16 by bearing members 64. Bellows 46 has its other side 66 connected to guide plate member 62, as by threaded fasteners 68.

Rack member 74 is provided mounted for linear reciprocable movement in bearing member 76. Bearing member 76 is supported between plate members 78, 80 mounted on plate member 82 secured to end plate member 14, as by threaded fasteners 84. Bearing member 76 extends through openings 86, 88 in end plate 14 and mounting plate 82. Inner end 90 of rack 74 extends inwardly from end plate member 14, as shown.

Rack 74 cooperatively meshes with segmented pinion 92 corresponding in shape to the sector of a circle having sides 94, 96 defining arcuate toothed segment 98 therebetween. Pinion 92 is mounted on shaft 100 rotatably supported by bearings 102 respectively mounted in plate member 78, 80. Stop screws 104, 106 are threaded in openings in bottom plate 108 and are held in the desired positions by stop nuts 110. Stop screws 104, 106, respectively engage sides 94, 96 of pinion 92 thereby selectively to limit the rotational extremities of its rotation movement.

Spring seat member 112 is secured to guide plate member 62, as by threaded fasteners (not shown). Ball joint 114 has stud portion 116 threaded in opening 118 of spring seat member 112 and is secured thereto by lock nut 120. Ball joint 122 is similarly secured to end 90 of rack 74. Link 124 connects ball joints 114, 122.

Spring seat member 126 is secured to end plate member 14, as by threaded fasteners (not shown). Coil compression spring 128 extends between end plate member 14 and guide plate member 62 surrounding ball joint 114, link 124, ball joint 122 and end 90 of rack 74 and having its opposite ends respectively seated on spring seat members 112, 126. Housing 130 extends between end plate members 12, 14 and encloses guide rod members 16, bellows 46 and spring 128. Breather plug 132 in end plate member 14 permits entry and exhaust of air from cavity 134 defined by housing 130 as bellows 46 expands and contracts.

It will now be seen that admission of air or other fluid under pressure to the interior of bellows 46 by valve 56 will result in expansion of bellows 46 toward its expanded position, thus imparting linear movement to rack 74 on its axis 136 through guide plate 62 moving on guide rod members 16 and link 124, spring 126 resisting movement of bellows 46 toward its expanded position. Linear movement of rack 74 on its axis 136 in the direction shown by arrow 136 will result in rotation of pinion 92 in the direction shown by arrow 138. Pinion shaft 100 may be provided with square ends 140 adapted to be connected to the device to be actuated, such as a butterfly valve. Upon actuation of valve 56 to terminate application of air under pressure to the interior of bellows 46, spring 128 expands thereby returning bellows 46 to its collapsed position, in turn moving rack 74 in the direction opposite that shown by arrow 136 and rotating pinion 92 and pinion shaft 100 in the direction opposite that shown by arrow 138. It will further be seen that the limits of the angular rotation of pinion 92 and pinion shaft 100 are established by adjustment of screws 104, 106.

Screws 42 are preferably sufficiently long so that the pressure exerted by spring 128 is fully relieved before screws 42 become disengaged with threaded members 40. In a physical embodiment of the improved rotary actuator 10 shown in the drawing in which the diameter of housing 30 was approximately 18½ inches and the overall length of housing 130 approximately 20½ inches, expansion of bellows 46 from its collapsed position toward its fully expanded position by approximately four inches provided 90° rotation of pinion 92 on pinion shaft 100. In that physical embodiment, an "Airstroke" No. 21 actuator manufactured by Firestone Rubber Company was employed for bellows 46.

While there have been described above the principles of this invention in connection with specific apparatus, it is to be clearly understood that this description is made only by way of example and not as a limitation to the scope of the invention.

What is claimed is:

1. Apparatus for converting reciprocating motion to rotary motion comprising a supporting frame having two spaced apart mounting elements rigidly secured together, a fluid pressure actuating device operatively mounted between said elements for producing reciprocal motion along a line extending between said elements, an engaged rack and pinion assembly operatively mounted on one of said mounting elements, said rack being connected to said actuating device for reciprocal longitudinal movement in response to reciprocal motion thereof, said pinion having a shape corresponding to the sector of a circle and having teeth on only the arcuate portion thereof, said pinion further having two abutment surfaces adjacent the opposite ends, respectively, of said arcuate portion, and two spaced-apart stop members adapted to be respectively engaged by said surfaces when said pinion is rotated between first and second positions, whereby the stroke of said actuating device is correspondingly limited.

2. The apparatus of claim 1 wherein said actuating device includes an expansible pneumatic bellows element having opposite sides engaged at one side with the other of said mounting elements, a rigid guide element engaged with the other of said opposite sides, at least two spaced apart guide bars rigidly secured between said mounting elements and extending parallel to said line, said guide element being slidably mounted on said guide bars thereby directing the expansive motion of said bellows element in a direction parallel to said line.

3. The apparatus of claim 2 in which said rack is connected to said guide element by means of a universally swivable link, and a compression spring interposed between said one mounting element and said guide element for urging said bellows element to its retracted, collapsed position.

4. The apparatus of claim 3 including pinion-supporting structure mounted on said one element on the side thereof remote from said bellows element, a pinion shaft mounted for rotation in said pinion-supporting structure and secured to said pinion for rotation therewith, said stop members being mounted in said pinion-supporting structure.

5. The apparatus of claim 4 wherein said two mounting elements are first and second parallel plates, respectively, disposed at right angles to the line of reciprocation of said rack, said first plate having a central opening which receives said rack, said guide bars being disposed adjacent the outer edges of said plates with said bellows element being disposed between said guide bars, said compression spring encircling said rack and engaging said first plate and said guide element.

6. The apparatus of claim 5 wherein said guide element is a flat plate disposed parallel with said first and second plates, said universally swivable link including a rod having ball joints at the opposite ends thereof, one ball joint being connected to the central portion of said flat plate and the other to one end of said rack.

7. The apparatus of claim 6 wherein said pinion-supporting structure includes two spaced parallel shaft-mounting plates having openings which receive said pinion shaft, bearings mounted on said shaft-mounting plates and rotatably supporting said shaft, said pinion being positioned between said shaft-mounting plates, a stop-mounting plate secured between said shaft-mounting plates and carrying said stop members, said stop members being threaded through said stop-mounting plate and adjustable therein, and said rack being positioned between said shaft mounting plates on the side of said pinion opposite from said stop members.

8. The apparatus of claim 7 including a rack bearing secured between said shaft-mounting plates, said rack slidably engaging said rack bearing whereby said rack is confined for movement between said pinion and said rack bearing, said rack bearing being elongated and having a longitudinally extending surface which complements the shape of the rack slidable thereon.

9. The apparatus of claim 8 in which said guide bars are hollow and have heads secured to one end which engage said second plate and internally threaded parts in the other end, threaded fasteners fitting said threaded parts and engaging said first plate thereby removably securing said first and second plates in assembly.

10. A rotary actuator comprising:

a bellows having inlet means for admitting fluid under pressure thereto thereby to cause expansion thereof from collapsed to expanded positions; first means for mounting said bellows for expansion and contraction along a first axis; resilient means for resisting expansion of said bellows and returning the same to said collapsed position upon release of fluid pressure therefrom; cooperating rack and pinion elements; second means for mounting said rack element for linear movement along said first axis; third means for mounting said pinion element for rotary movement on a second axis normal to said first axis; means for operatively connecting said rack element to said bellows whereby said pinion element is rotated in opposite directions in response to expansion and contraction of said bellows; said pinion element having two angularly spaced abutments thereon; and adjustable stop members respectively engaging said abutments in first and second rotational positions of said pinion element thereby limiting the rotational movement thereof.

11. The actuator of claim 10 wherein said first mounting means comprises first and second spaced-apart end members, guide members connecting said end members and parallel with said first axis, said bellows having opposite sides, one of said bellows sides being connected to said first end member, and a movable member mounted on said guide member for linear movement thereon, the other of said bellow sides being connected to said movable member, said connecting means being connected to said movable member, said resilient means acting between said second end member and said movable member, said second and third mounting means being mounted on said second end member.

12. The actuator of claim 11 further comprising a housing extending between said first and second end members and enclosing said bellows, guide members, movable member, resilient means and connecting means.

13. The rotary actuator of claim 10 wherein said pinion corresponds to the shape of the sector of a circle and having teeth on only the arcuate portion thereof, the sides of the pinion corresponding to the sides of such sector and being spaced from the axis of rotation of said pinion, said pinion sides serving as said abutments.

14. The rotary actuator of claim 13 wherein said pinion sides are orthogonally related and said arcuate portion extends therebetween.

* * * * *